United States Patent
Dupuie

[11] Patent Number: 5,956,836
[45] Date of Patent: Sep. 28, 1999

[54] METHOD OF MAKING A TORSIONAL DAMPER

[75] Inventor: Bradley Alan Dupuie, Bay City, Mich.

[73] Assignee: General Motors Corporation, Detroit, Mich.

[21] Appl. No.: 09/072,233

[22] Filed: May 4, 1998

[51] Int. Cl.[6] .................................................. B21D 35/00
[52] U.S. Cl. ........................... 29/469.5; 74/492; 464/89; 464/181
[58] Field of Search .............................. 29/469.5; 74/574, 74/492; 280/779; 156/294; 464/181, 89, 83, 85, 92, 183

[56] References Cited

U.S. PATENT DOCUMENTS

| | | | |
|---|---|---|---|
| 4,385,897 | 5/1983 | Mallet | 464/89 |
| 4,509,775 | 4/1985 | Arndt | 280/779 |
| 4,787,878 | 11/1988 | Nikkel | 464/83 |
| 4,983,143 | 1/1991 | Sekine et al. | 464/89 |
| 5,086,661 | 2/1992 | Hancock | 74/493 |
| 5,259,818 | 11/1993 | Kachi et al. | 464/89 |

*Primary Examiner*—P. W. Echols
*Assistant Examiner*—John C. Hong
*Attorney, Agent, or Firm*—Dean L. Ellis

[57] ABSTRACT

A method of making a torsional damper for a motor vehicle intermediate steering shaft including the steps of forming a tubular end on a shaft of the intermediate steering shaft, forming a damper chamber in a yoke of a torsionally rigid universal coupling around and oversize relative to the tubular end of the shaft so that an uncalibrated annular clearance is defined therebetween, disposing a tubular torsion block in the uncalibrated annular clearance with an outside surface bonded to an inside surface of the damper chamber and an inside surface bonded to an outside surface of the tubular end of the shaft, and converting the uncalibrated annular chamber to a calibrated annular chamber by expanding the tubular end of the shaft inside of the damper chamber to radially compress tubular torsion block and increase the torsional stiffness thereof. In a preferred embodiment of the method according to this invention, the tubular torsion block is formed-in-place by injecting a flowable melt of an elastomeric material into the uncalibrated annular clearance which cures solid and is self-bonding to the inside surface of the damper chamber and to the outside surface of the tubular end of the shaft.

5 Claims, 2 Drawing Sheets

METHOD OF MAKING A TORSIONAL DAMPER

TECHNICAL FIELD

This invention relates to a method of making a torsional damper between a shaft and a yoke.

BACKGROUND OF THE INVENTION

U.S. Pat. No. 4,509,775, issued Apr. 9, 1985 and assigned to the assignee of this invention, describes an intermediate steering shaft between a steering shaft of a motor vehicle and an input shaft of a steering gear of the motor vehicle. The intermediate steering shaft includes a pair of torsionally rigid universal couplings at opposite ends of the intermediate steering shaft and a pair of telescopically related solid and tubular shafts. The solid shaft is rigidly connected to a yoke of a first one of the torsionally rigid universal couplings. The tubular shaft is slidable on and drivingly connected to the solid shaft and connected to a yoke of a second one of the torsionally rigid universal couplings through a torsional damper which damps torsional vibrations emanating from the steering gear input shaft. The torsional damper includes a cylindrical connector sleeve rigidly attached to the yoke of the second torsionally rigid universal coupling and a tubular torsion block made of rubber or suitable elastomer having an outside surface bonded to the connector sleeve and an inside surface bonded to the tubular shaft. Commonly, the torsional stiffness of the torsional damper is changed for application in different motor vehicle models by changing the material composition of the torsion block. A method according to this invention of making a torsional damper for an intermediate steering shaft affords the option of changing the torsional stiffness of the damper without changing the material composition of the torsion block.

SUMMARY OF THE INVENTION

This invention is a new and improved method of making a torsional damper for a motor vehicle intermediate steering shaft including the steps of forming a tubular end on a shaft of the intermediate steering shaft, forming a damper chamber in a yoke of a torsionally rigid universal coupling of the intermediate steering shaft around and oversize relative to the tubular end of the shaft so that an uncalibrated annular clearance is defined therebetween, disposing a tubular torsion block in the uncalibrated annular clearance with an outside surface bonded to an inside surface of the damper chamber and an inside surface bonded to an outside surface of the tubular end of the shaft, and converting the uncalibrated annular chamber into a calibrated annular chamber by expanding the tubular end of the shaft inside of the damper chamber to radially compress the tubular torsion block and increase the torsional stiffness thereof. In a preferred embodiment of the method according to this invention, the tubular torsion block is formed-in-place by injecting a flowable melt of an elastomeric material into the uncalibrated annular clearance which cures solid and is self-bonding to the inside surface of the damper chamber and to the outside surface of the tubular end of the shaft.

DESCRIPTION OF THE PREFERRED EMBODIMENT

Figure 1:
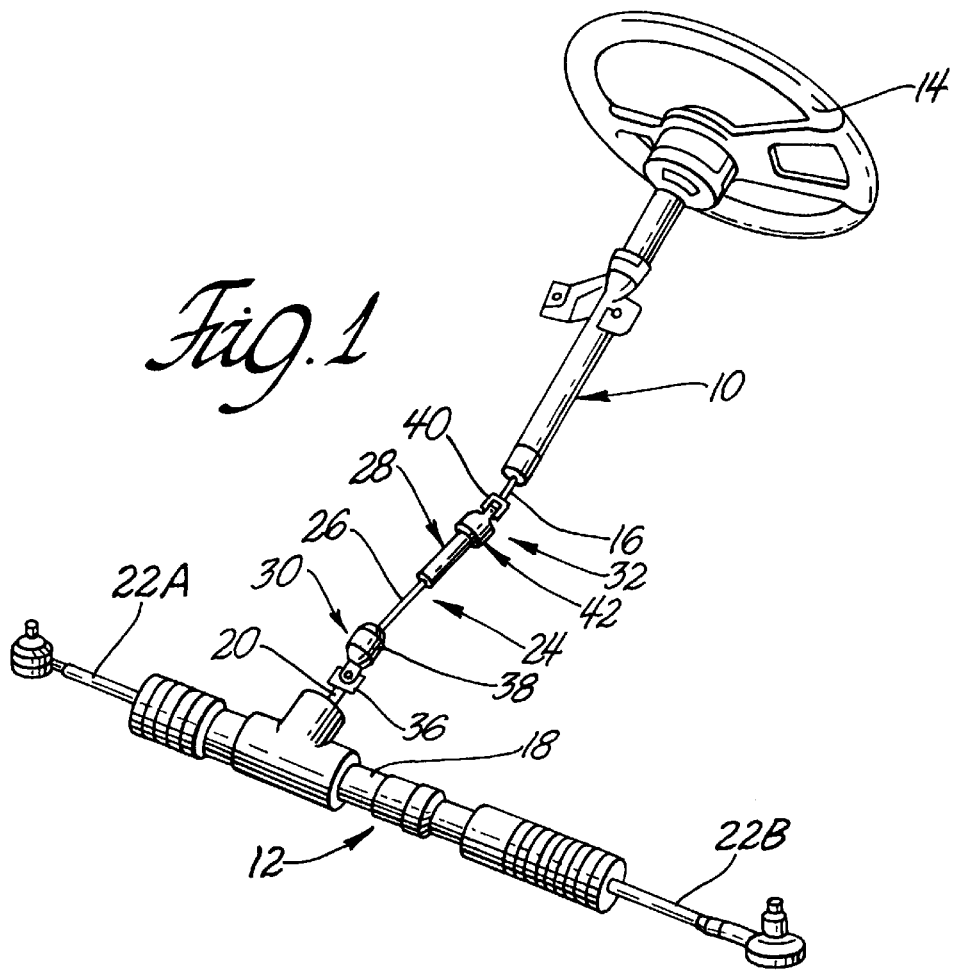
FIG. 1 is a schematic perspective view of a motor vehicle steering column, a motor vehicle steering gear, and an intermediate steering shaft having a torsional damper made by a method according to this invention.

Referring to FIG. 1, a schematically represented steering column 10 is supported on a body, not shown, of a motor vehicle and separated longitudinally from a schematically represented rack and pinion steering gear 12 of the motor vehicle. A steering hand wheel 14 is rigidly attached to an upper end of a steering shaft 16 rotatably supported on the steering column 10. The steering gear 12 includes a housing 18 and an input shaft 20 rotatably supported on the housing. Rack and pinion gears, not shown, in the housing 18 convert rotation of the input shaft 20 to back and forth linear translation of a rack bar, not shown, in the housing. A pair of tie rods 22A,22B link opposite ends of the aforesaid rack bar to steerable wheels, not shown, for steering the motor vehicle in conventional fashion.

An intermediate steering shaft 24 of the motor vehicle includes a solid shaft 26, a tubular shaft 28, a first torsionally rigid universal coupling or universal joint 30, and a second torsionally rigid universal coupling or universal joint 32. The tubular shaft 28 telescopically overlaps the solid shaft 26 for lengthwise adjustment of the intermediate steering shaft and is drivingly connected to the solid shaft for torque transfer therebetween by a plurality of inside splines 34, FIGS. 2–4, which mesh with a corresponding plurality of outside splines, not shown, on the solid shaft. Manual effort applied at the steering hand wheel 14 is transferred from the steering shaft 16 to the steering gear input shaft 20 through the intermediate steering shaft.

The first torsionally rigid universal coupling 30 has an outboard yoke 36 rigidly attached to the steering gear input shaft 20, an inboard yoke 38 rigidly attached to the solid shaft 26, and a cross-shaped spider, not shown, articulated between the yokes in conventional fashion. The second torsionally rigid universal coupling 32 includes an outboard yoke 40 rigidly attached to the steering shaft 16 on the steering column 10, an inboard yoke 42, and a cross-shaped spider, not shown, articulated between the yokes in conventional fashion. The inboard yoke 42 is connected to the tubular shaft 28 though a torsional damper 44 made by a method according to this invention.

Figure 3:
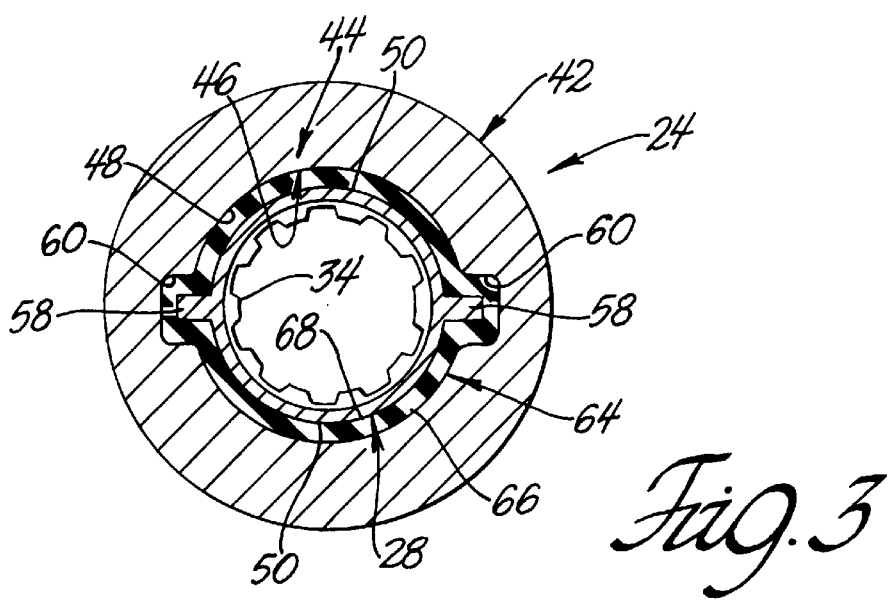
FIG. 3 is a sectional view taken generally along the plane indicated by lines 3—3 in FIG. 2.
Figure 2:
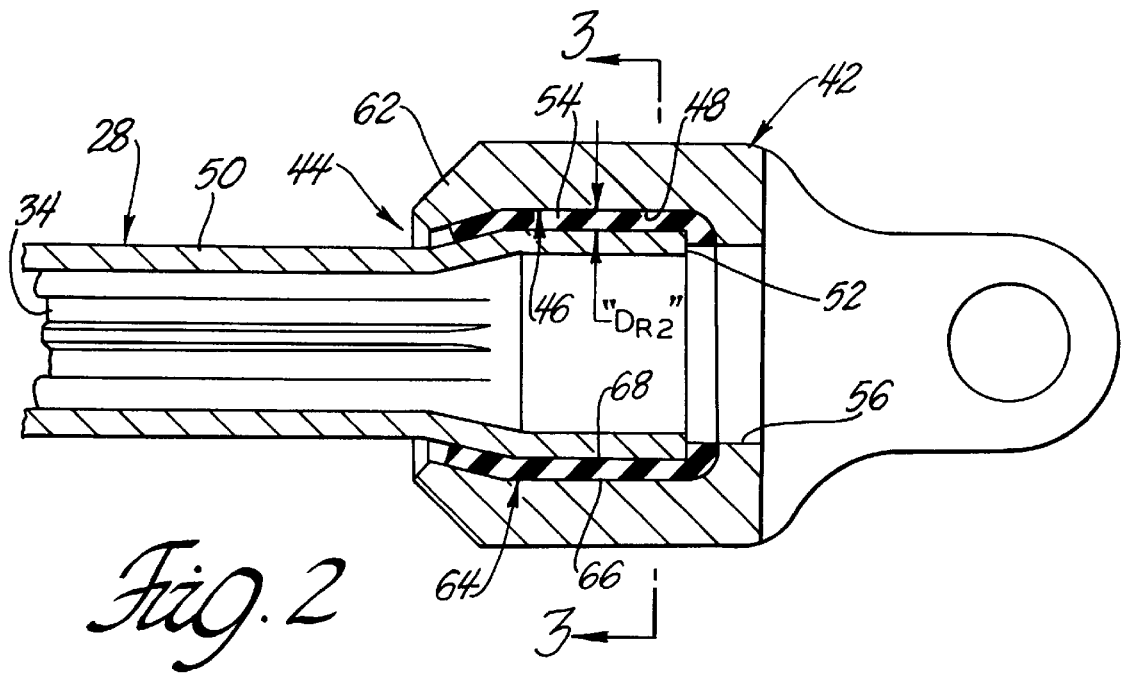
FIG. 2 is an enlarged longitudinal sectional view of the torsional damper made by the method according to this invention.

As seen best in FIGS. 2–3, the torsional damper 44 includes a cup-shaped damper chamber 46 in the inboard yoke having a cylindrical inside surface 48 oversize relative to a cylindrical outside surface 50 of a tubular end 52 of the tubular shaft 28 disposed in the damper chamber. The inside surface 48 of the damper chamber cooperates with the outside surface 50 of the tubular end of the tubular shaft in defining a calibrated annular clearance 54 therebetween, FIG. 2. The inside of the tubular end 52 of the tubular shaft 28 is exposed through a window 56 in the inboard yoke 42 at the bottom of the damper chamber 46. A plurality of lugs 58 on the tubular end of the tubular shaft face a corresponding plurality of pockets 60 in the damper chamber. A rolled lip 62 on the inboard yoke obstructs the open end of the calibrated annular clearance 54.

A tubular torsion block 64 made of rubber or other suitable elastomer is disposed in the calibrated annular clearance 54 and includes an outside surface 66 bonded to the inside surface 48 of the damper chamber 46 and an inside surface 68 bonded to the outside surface 50 of the tubular end 52 of the tubular shaft. With respect to manual effort applied at the steering hand wheel 14 to steer the motor vehicle, the torsion block resiliently transfers torque from the inboard yoke 42 to the tubular shaft 28. With respect to torsional vibrations emanating from the steering gear input shaft 20, the torsion block functions as a damper which minimizes transfer of such vibrations to the steering shaft 16 and to the steering hand wheel 14. The lugs 58 cooperate with the pockets 60 in limiting torsional flexure of the tubular torsion block 64. The rolled lip 62 on the inboard yoke positively prevents dislodgment of the tubular end of the tubular shaft from the damper chamber.

The torsional stiffness of the tubular torsion block 64 is a characteristic of the intermediate steering shaft which bears on an operator's perception of the handling and performance of the motor vehicle. A relatively torsionally stiff torsion block, for example, may be appropriate for a sporty motor vehicle while a less torsionally stiff torsion block may be appropriate for a less sporty motor vehicle. To satisfy a range of expectations regarding vehicle handling and performance, it is necessary that the torsional stiffness of the tubular torsion block 64 vary from vehicle model to vehicle model. A method according to this invention of making a torsional damper affords the option of achieving such variability without changing the material composition of the tubular torsion block.

Figure 4:
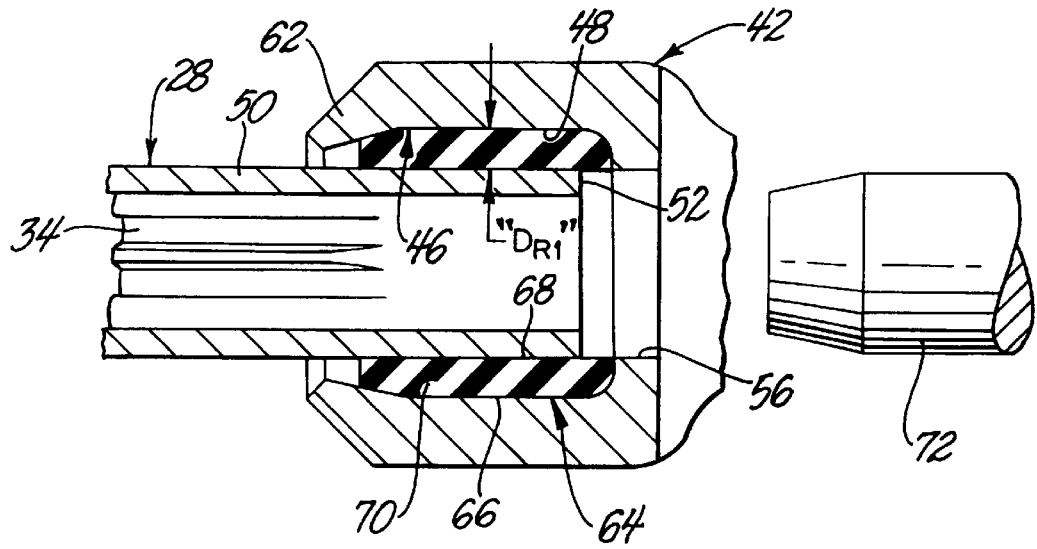
FIG. 4 is a sectional view similar to FIG. 2 schematically illustrating a step in the method according to this invention of making the torsional damper.

Referring to FIGS. 2 and 4, the method according to this invention of making the torsional damper 44 includes a step of forming the tubular end 52 on the tubular shaft 28 and another step of forming the damping chamber 46 in the inboard yoke 42 having the inside surface 48 thereof oversize relative to the outside surface 50 of the tubular end of the tubular shaft. The inside and outside surfaces 48,50 cooperate in defining an uncalibrated annular chamber 70, FIG. 4, having a radial depth dimension "$D_{R1}$" between the inside surface 48 and the outside surface 50 exceeding a corresponding radial depth dimension "$D_{R2}$" of the calibrated annular chamber 54 described above.

The method according to this invention includes the further step of forming the tubular torsion block 64 from a material such as rubber or thermoplastic elastomers which exhibits increasing torsional stiffness when subjected to increasing compression and disposing the tubular torsion block in the uncalibrated annular chamber 70. The wall thickness of the tubular torsion block 64 substantially corresponds to the radial depth dimension "$D_{R1}$" of the uncalibrated annular chamber 70 so that the torsion element experiences little or no radial compression when first disposed in the uncalibrated annular chamber.

After the tubular torsion block is disposed in the uncalibrated annular chamber 70 its inside and outside surfaces 68,66 are bonded to the outside surface 50 of the tubular end 52 of the tubular shaft and to the inside surface 48 of the damper chamber 46, respectively. It is within the scope of this invention that this step be performed concurrently with disposing the tubular torsion block in the uncalibrated annular chamber 70 when the torsion block is formed-in-place by injecting a flowable melt of an appropriate elastomeric material into the uncalibrated annular chamber.

After the tubular torsion block 64 is bonded to the inboard yoke 42 and to the tubular end 52 of the tubular shaft 28 as described above, a schematically represented expanding tool 72, FIG. 4, is introduced into the tubular end of the tubular shaft through the window 56 in the inboard yoke. The expanding tool 56 converts the uncalibrated annular chamber 70 into the calibrated annular chamber 54 by expanding the tubular end 52 of the tubular shaft and reducing the radial depth dimension "$D_{R1}$" of the uncalibrated annular chamber to the radial depth dimension "$D_{R2}$" of the calibrated annular chamber. The difference between the radial depth dimensions "$D_{R1}$", "$D_{R2}$" is calculated to achieve a predetermined radial compression of the torsion block 64 corresponding to a desired torsional stiffness of the torsion block. Accordingly, the difference between the radial depth dimensions "$D_{R1}$", "$D_{R2}$" can be varied to vary the torsional stiffness characteristics of the torsional damper 44.

An important advantage of practicing the method according to this invention is that it affords a manufacturer the option of achieving different torsional stiffness performance in intermediate steering shafts for different model motor vehicles without resorting to changing the material composition of the torsion block 64 but, rather, by using one material or one initial size torsion block and simply varying the amount of compression thereof. A manufacture may, therefore, avoid the economic penalties associated with having to make torsion blocks from different material composition for different vehicle models.

Having thus described the invention, what is claimed is:

1. A method of making a torsional damper between a shaft and a yoke comprising the steps of:

forming a tubular end on said shaft, forming a tubular torsion block having a predetermined radial wall thickness, forming a damper chamber in said yoke around said tubular end of said shaft having an inside surface oversize relative to an outside surface on said tubular end of said shaft and cooperating with said outside surface in defining an uncalibrated annular clearance therebetween having a radial depth dimension substantially equal to said radial wall thickness of said tubular torsion block, disposing said tubular torsional block in said uncalibrated annular clearance, bonding an outside surface of said tubular torsion block to an inside surface of said damper chamber and bonding an inside surface of said tubular torsion block to an outside surface of said tubular end of said shaft so that said tubular torsion block resiliently transfers torque between said yoke and said shaft, and converting said uncalibrated annular clearance to a calibrated annular clearance by expanding said tubular end of said shaft inside of said damper chamber thereby to decrease said radial depth dimension of said uncalibrated annular chamber and radially compress said tubular torsion block to increase the torsional stiffness of said tubular torsion block.

2. The method of making a torsional damper between a shaft and a yoke recited in claim 1 wherein the step of converting said uncalibrated annular clearance to a calibrated annular clearance by expanding said tubular end of said shaft inside of said damper chamber comprises the steps of:

forming a window in said yoke through which said tubular end of said shaft inside of said damper chamber is exposed, and inserting an expanding tool into said tubular end of said shaft through said window in said yoke.

3. The method of making a torsional damper between a shaft and a yoke recited in claim 2 wherein the steps of disposing said tubular torsional block in said uncalibrated annular clearance and bonding an outside surface of said tubular torsion block to an inside surface of said damper chamber and bonding an inside surface of said tubular torsion block to an outside surface of said tubular end of said shaft comprises the steps of:

injecting a flowable melt of an elastomeric material into said uncalibrated annular clearance which flowable melt cures solid to form said tubular torsion block and which flowable melt is self-bonding to the inside surface of the damper chamber and to the outside surface of the tubular end of the shaft.

4. The method of making a torsional damper between a shaft and a yoke recited in claim 3 further comprising the steps of:

forming a plurality of lugs on said tubular end of said shaft, and forming a plurality of pockets in said damper chamber surrounding respective ones of said lugs and cooperating therewith in positively limiting torsional flexure of said tubular torsion block.

5. The method of making a torsional damper between a shaft and a yoke recited in claim 4 further comprising the step of:

forming a rolled lip on an end of said yoke obstructing an end of said calibrated annular chamber and positively preventing dislodgment of said tubular end of said shaft from said damper chamber.

* * * * *